(12) United States Patent
Schwartz

(10) Patent No.: US 10,264,339 B2
(45) Date of Patent: Apr. 16, 2019

(54) WEARABLE VIBRATION DEVICE

(71) Applicant: David Todd Schwartz, Livingston, NJ (US)

(72) Inventor: David Todd Schwartz, Livingston, NJ (US)

( * ) Notice: Subject to any disclaimer, the term of this patent is extended or adjusted under 35 U.S.C. 154(b) by 0 days.

(21) Appl. No.: 15/075,073

(22) Filed: Mar. 18, 2016

(65) Prior Publication Data

US 2016/0203685 A1 Jul. 14, 2016

Related U.S. Application Data

(63) Continuation-in-part of application No. 14/298,476, filed on Jun. 6, 2014, now abandoned.

(51) Int. Cl.
*H04R 1/02* (2006.01)
*G09B 21/00* (2006.01)
*G08B 6/00* (2006.01)

(52) U.S. Cl.
CPC ........... *H04R 1/028* (2013.01); *G09B 21/003* (2013.01); *G09B 21/009* (2013.01); *G08B 6/00* (2013.01); *H04R 2201/023* (2013.01); *H04R 2420/07* (2013.01); *H04R 2460/13* (2013.01)

(58) Field of Classification Search
CPC .............. H04R 1/028; H04R 2201/023; H04R 2460/13; H04R 2420/07; G09B 21/003; G09B 21/009
USPC ........................................... 340/407.1, 407.2
See application file for complete search history.

(56) References Cited

U.S. PATENT DOCUMENTS

| | | | | |
|---|---|---|---|---|
| 4,412,106 A | * | 10/1983 | Pavel .................. | G11B 25/063 224/673 |
| 5,515,764 A | * | 5/1996 | Rosen .................. | G04F 5/025 84/484 |
| 2007/0041600 A1 | * | 2/2007 | Zachman ............... | A61F 11/04 381/312 |
| 2007/0088433 A1 | * | 4/2007 | Esch .................... | A61F 2/1635 623/6.13 |
| 2008/0137880 A1 | * | 6/2008 | Mills .................... | H04R 1/026 381/79 |
| 2009/0169024 A1 | * | 7/2009 | Krug .................... | H04R 29/00 381/58 |
| 2009/0180646 A1 | * | 7/2009 | Vulfson ................. | H04R 1/02 381/151 |
| 2012/0245406 A1 | * | 9/2012 | Aghamohammadi .. | A61F 11/04 600/25 |
| 2013/0108995 A1 | * | 5/2013 | DePasqua .............. | G09B 23/28 434/236 |
| 2013/0229271 A1 | * | 9/2013 | Fantauzza .............. | G06F 3/016 340/407.1 |
| 2015/0054727 A1 | * | 2/2015 | Saboune ............... | G06F 3/0414 345/156 |

\* cited by examiner

*Primary Examiner* — Steven Lim
*Assistant Examiner* — Mancil Littlejohn, Jr.
(74) *Attorney, Agent, or Firm* — Dunlap, Bennett & Ludwig, PLLC; Brendan E. Squire

(57) ABSTRACT

A wearable haptic device is provided. The wearable haptic device includes a band having at least one haptic device attached to the band. A power source is operatively connected to the vibration device. The vibration device may further include an input configured to connect to a music playing device. The vibration device produces a vibration based on the output of the music playing device.

20 Claims, 3 Drawing Sheets

WEARABLE VIBRATION DEVICE

CROSS-REFERENCE TO RELATED APPLICATION

This application claims the benefit of priority of U.S. patent application Ser. No. 14/298,476, filed Jun. 6, 2014 the contents of which are herein incorporated by reference.

BACKGROUND OF THE INVENTION

The present invention relates to portable music and, more particularly, to a wearable haptic device for use with portable music players.

Currently, many people wear headphones or ear buds to listen to music while using a portable music playing device. However, when listening to music using headphones or ear buds, the user does not experience the feel of the sound similar to music being played at a night club, a concert, or when being played by a loud stereo. Further, the hearing impaired do not experience anything while using headphones or ear buds.

Similarly, when using wireless headphones, such as Bluetooth, each device is only configured with a single communications channel, such that the user's portable music player is only able to communicate with their headphones and are unable to wirelessly communicate with an additional device.

As can be seen, there is a need for a device that adds vibration while listening to music from a portable device and one that provides the capability to communicate with more than one output.

SUMMARY OF THE INVENTION

In one aspect of the present invention, a wearable vibration device comprising: a band; at least one vibration device attached to the band; a power source operatively connected to the vibration device; and an input operatively connected to the vibration device, wherein the input is configured to connect to a music playing device, wherein the vibration device is configured to produce a vibration based on the output of the music playing device.

These and other features, aspects and advantages of the present invention will become better understood with reference to the following drawings, description and claims.

DETAILED DESCRIPTION OF THE INVENTION

Figure 1:
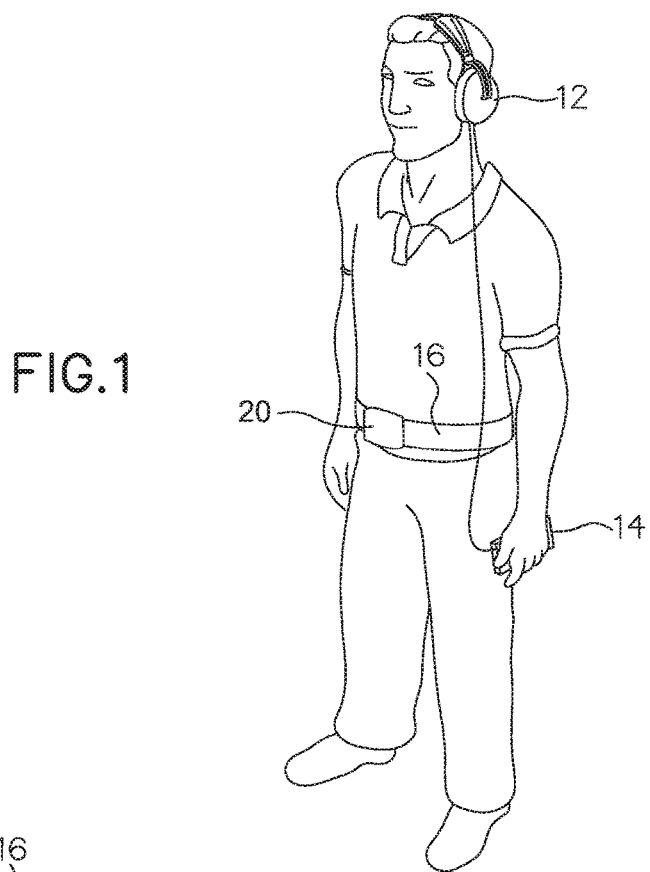
FIG. 1 is a perspective view of an embodiment of the present invention shown in use.
Figure 2:
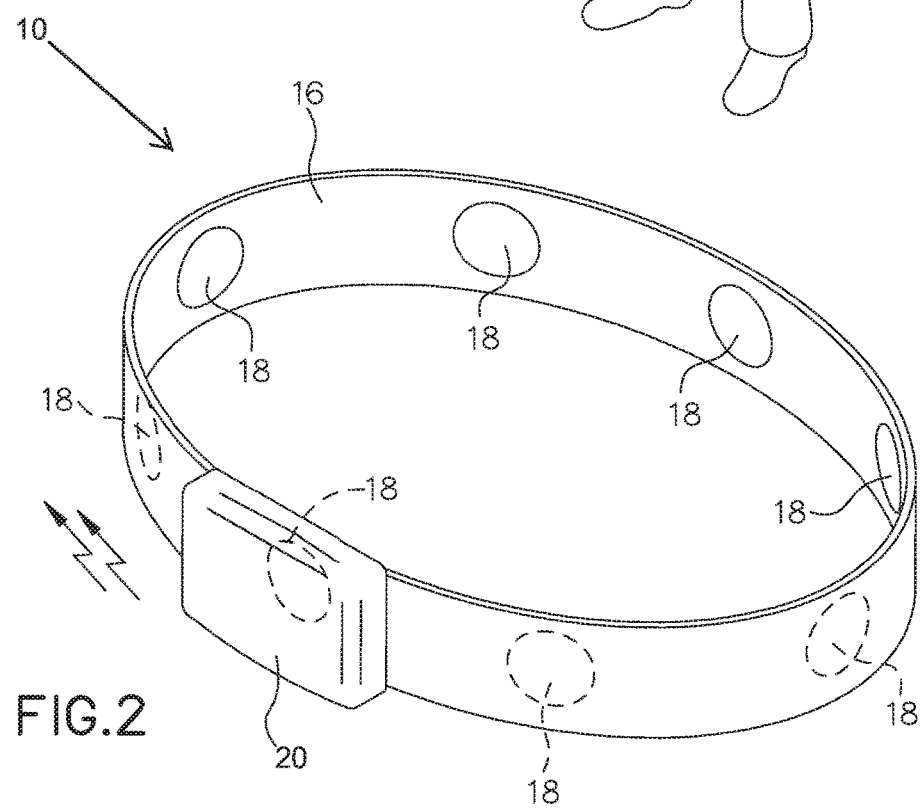
FIG. 2 is a perspective view of an embodiment of the present invention.
Figure 3:
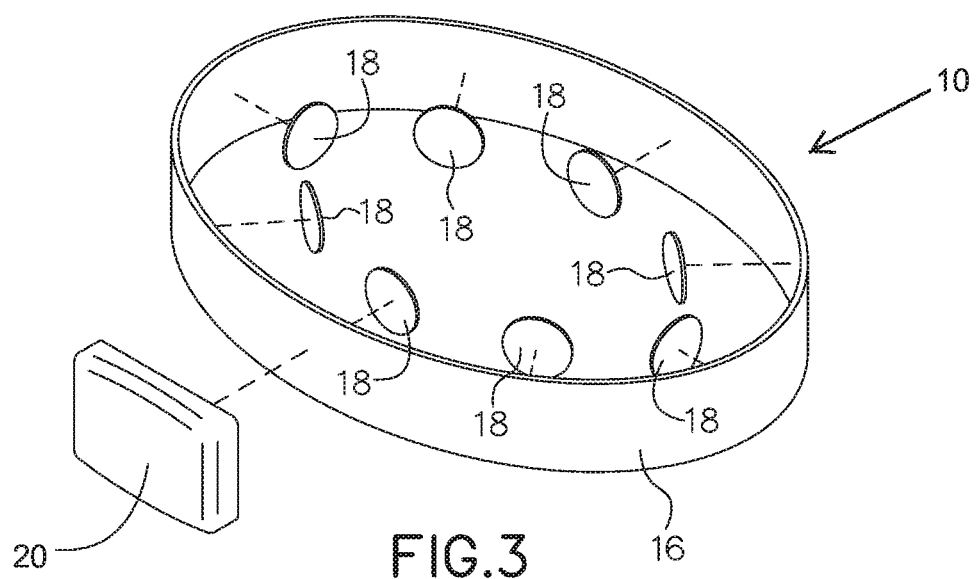
FIG. 3 is an exploded view of an embodiment of the present invention.
Figure 4:
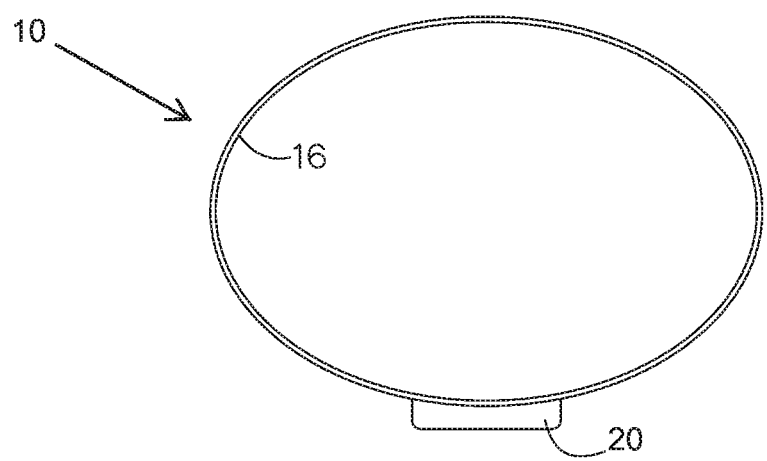
FIG. 4 is a top view of an embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a wearable belt, anklet or bracelet configured with haptic transducers to provide a user to feel the beat of a filtered audio signal produced by a portable audio device, so that a user can feel the beat in their core or in their feet as if the user was hearing the music in a concert, club or through a loud stereo. The present invention also facilitates the ability for users to listen to music on a wireless sound output device, while using a portable device with the sound disseminated into other parts of the body.

Referring to FIGS. 1 through 4, the present invention includes a wearable haptic device 10. The wearable haptic device 10 includes a band 16 having at least one haptic transducer 18 attached to the band 16. A power source 20 is operatively connected to power an electronic circuit 30 to drive the haptic transducer 18. The haptic device 10 may further include an input configured to connect to an audio signal producing device 14, or sound producing device such as an MP3 music playing device and/or a video game playing device. The haptic transducer 18 produces a tactile output based on the output of the audio signal producing device 14.

The band 16 may include an inner surface and an outer surface, and may be looped and worn around a user's body with the inside surface facing the user. For example, the band 16 of the present invention may be a belt worn around the user's waist. The band 16 may also be an anklet or bracelet worn on the user's wrist or ankle. In certain embodiments, the band 16 may include a buckle to attach to the user. The band 16 may also be made of a polymer stretchable material and may not need a buckle. In certain embodiments, lights may be attached to the belt that flicker to the music beat.

In certain embodiments, the at least one haptic transducer 18 may include a plurality of haptic transducers 18, such as four to eight haptic transducers 18. The haptic transducer 18 may be attached to the band 16 so that the haptic transducer 18 emits towards the inner surface of the band 16. In certain embodiments, the haptic transducer 18 may be attached to the inner surface of the band 16. The haptic transducer 18 may be configured to emit a low frequency haptics to the user. In certain embodiments, there may be a control to control the output produced by the haptic transducers 18. Further, there may be an overdrive feature and a vibration echo with small internal spinning motor.

The haptic device 10 of the present invention may be operatively attachable to the sound producing device 14 with wires or wirelessly. For example, the haptic device 10 may include a wireless input 34 that is connected to a wireless output 32 of the sound producing device 14. In such embodiments, the haptic device 10 may be connected to the sound producing device 14 via Bluetooth®. Bluetooth is a wireless technology standard for exchanging data over short distances (using short-wavelength UHF radio waves in the ISM band from 2.4 to 2.485 GHz) from fixed and mobile devices. Therefore, the haptic transducer 18 may produce a haptic output directly correlated with the bass of the music or audio that is playing on the sound producing device 14 and listened to by the user using headphones or other audio listening device 12.

The power source 20 of the device 10 may be any suitable power source that is able to power the haptic device 10. For example, a wire plug may be operatively connected to the haptic device 10 which may be connected to an AC outlet.

In certain embodiments, the power source 20 may include a rechargeable battery 20 that may be removably attachable to the band 16 or integrated with a housing containing the electronic circuit 30. In such embodiments, the user may recharge their battery 20 and then connect the battery 20 to the band to use the present invention as a portable device.

Figure 5:
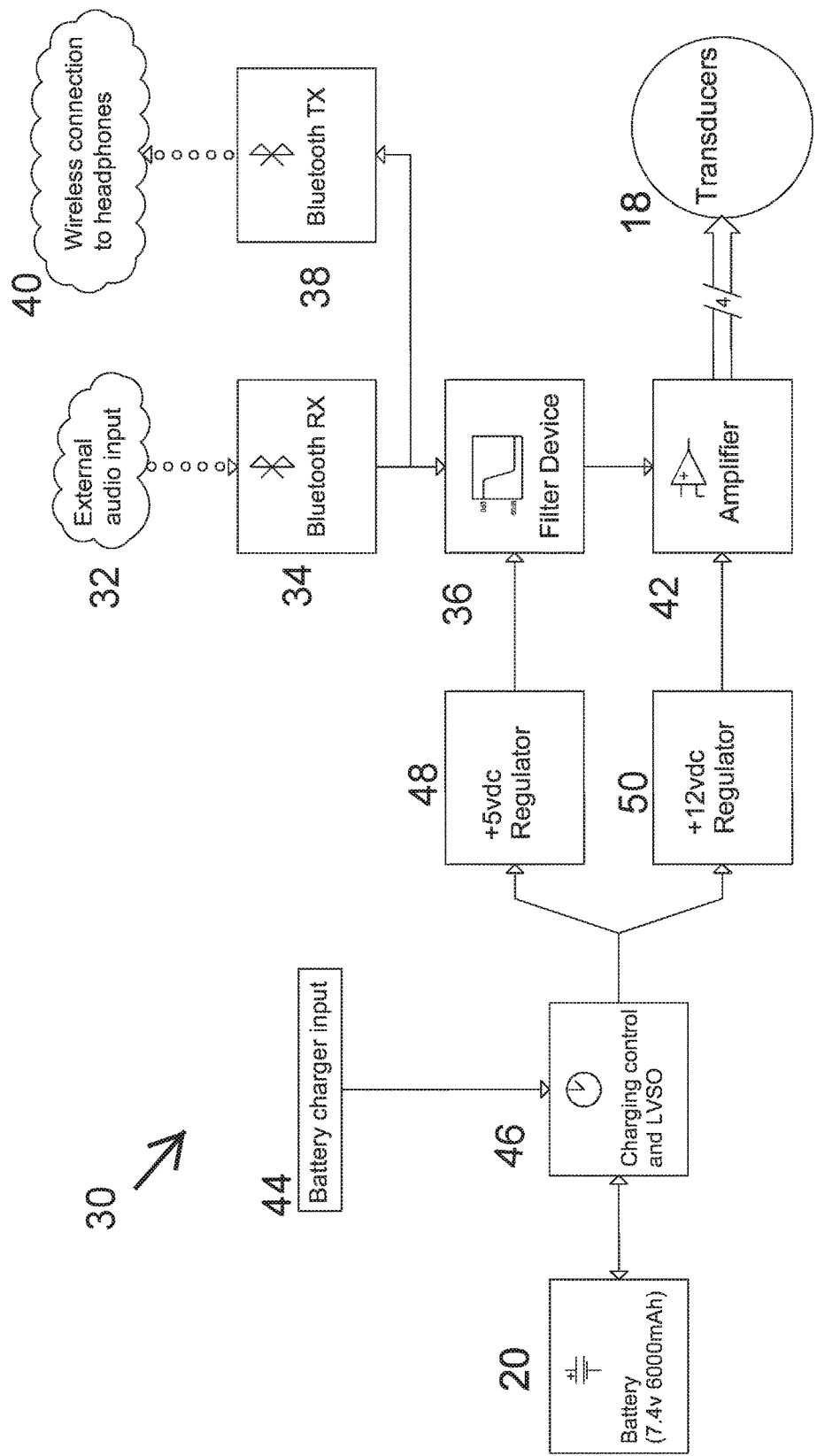
FIG. 5 is a schematic diagram of a system circuit implementing aspects of the invention.

FIG. 5 depicts an embodiment of a schematic electronic circuit 30 implementing aspects of the invention. Beginning with an external audio input 32, from a sound producing device 14, such as an MP3 player, a smart phone, and the like, a raw audio input signal is received via a Bluetooth receiver (RX) 34 to a first filtering stage 36 of the electronic circuit 30. The raw audio signal enters the first filter 36, which may be an analog only filter in which the frequencies between about 5 hz-200 hz will pass through, thus eliminating the mid range and hi end frequencies that are not necessary in driving the haptic device 18 on the belt 16.

The incoming raw audio signal is simultaneously duplicated and is output to a Bluetooth transmitter 38. The Bluetooth transmitter 38 is configured to transmit an audio signal that is operatively coupled to an audio output device 40, such as a Bluetooth connected headphone, speaker, or Bluetooth receiver operatively coupled to an audio system. This echo configuration overcomes the inherent limitations of Bluetooth which can only establish a link between a single source and a single device.

After the signal passes through analog processing filter 36 it enters an amplifier 42, which may be a digital amplifier, for amplification of the filtered signal to further drive the low end frequencies signals allowed to pass through the filter 36.

This combination of analog and digital processing takes the raw audio signal and transforms it into a more amplified signal in the low frequency range suited to the haptic transducer 18. The processed signal at that point is nothing like the raw audio source feed with the exception of the low end dynamics.

The amplified and processed signal is then output driven through one or more tactile transducers 18, such as the Puck model TT25-16 tactile transducer, manufactured by DaytonAudio, of Springboro, Ohio. In a preferred embodiment, the haptic transducers 18 are modified and formed of lightweight materials, such as aluminum or titanium, rather than a high mass material. The lightweight materials are better suited for effective transfer the dynamic low end to activate the tactile transducers 18 that allow users to feel the processed sounds that they may listen to on their headset 40.

In further reference to FIG. 5, a power source 20 is provided to power the circuit 30. The power source 20 may include a rechargeable battery, and powers the circuit 30 through a first voltage regulator 48 and a second voltage regulator 50. The first voltage regulator 48 provides power to operate the communications and signal processing elements of the circuit 30, while the second voltage regulator 50 provides power to drive the amplifier 42 and haptic transducers 18. Charging of the power source may be provided by a charging control 46 coupled to a charger input 44.

A method of using the present invention may include the following. A user may place a band 16 including a plurality of haptic devices 18 on their body. For example, the user may wrap the band 16 around their waist. The user may then wirelessly connect the haptic devices 18 to a sound producing device 4, such as an Mp3 player. The user may then select the music to listen to. The haptic transducers 18 may then produce haptic stimuli based on the music playing through the headphones 12. The method may further include wirelessly receiving an external audio input by the haptic device 10 and wirelessly transmitting the audio signal to an audio output device 40, such as headphones, or speakers. In a preferred embodiment, the method may concurrently connect the haptic device 10 wirelessly with an external audio input 32 and an external audio output device 40. A method of making the present invention may include the following.

Custom sheets of flexible plastic may be insulated by foam to form the band 16. The haptic transducers 18 may be embedded within the belt. The present invention may further include embedded electric wiring, a rechargeable battery 20, and wireless or Bluetooth® signal processing 34, 38. The above mentioned components may be encased in the wearable haptic device 10 which fastens and adjusts to size of the user's waist or ankle.

It should be understood, of course, that the foregoing relates to exemplary embodiments of the invention and that modifications may be made without departing from the spirit and scope of the invention as set forth in the following claims.

What is claimed is:

1. A wearable haptic device comprising: a band; at least one haptic transducer attached to an interior surface of the band, the haptic transducer having a solid low mass exciter configured to produce only an inaudible tactile haptic output directed towards a body surface of a wearer; a Bluetooth receiver operatively connected to the haptic device, wherein the Bluetooth receiver is configured to wirelessly connect to an external audio input signal, a low pass filter operatively connected to the output of the Bluetooth receiver, configured to produce a filtered output of the external audio input signal; an amplifier operatively connected to the low pass filter, configured to produce an amplified filtered output to the at least one haptic transducer; wherein the haptic transducer is operatively connected to the amplifier and configured to produce the inaudible tactile haptic output based on the amplified filtered output: and a Bluetooth transmitter directly connected to the output of the Bluetooth receiver and configured to wirelessly connect to an audio listening device.

2. The wearable haptic device claim 1, wherein the band is a belt formed to fit around a user's waist.

3. The wearable haptic device of claim 1, wherein the haptic transducer comprises an emitter surface comprising one of aluminum or titanium.

4. The wearable haptic device of claim 1, wherein the at least one haptic transducer is configured to emit a low frequency inaudible tactile haptic output.

5. The wearable haptic device of claim 4, wherein the low frequency inaudible tactile haptic output is between about 5 hz and 20 hz.

6. The wearable haptic device of claim 5, wherein the band comprises an inner surface and an outer surface, wherein the at least one haptic transducer is oriented to deliver the haptic output towards the inner surface.

7. The wearable haptic device of claim 6, wherein the at least one haptic transducer is attached to the inner surface of the band.

8. The wearable haptic device of claim 7, wherein the at least one haptic device is a plurality of haptic devices.

9. The wearable haptic device of claim 7, wherein the filter is an analog filter.

10. The wearable haptic device of claim 9, wherein the amplifier is a digital filter.

11. The wearable haptic device of claim 1, wherein the sound producing device is a music playing device.

12. The wearable haptic device of claim 1, wherein the sound producing device is a video game playing device.

13. A wearable haptic device, comprising: a band; a receiver operatively connected to the haptic device, wherein the receiver is configured to wirelessly connect to an external audio input signal via a first Bluetooth connection, a transmitter directly connected to an output of the receiver the haptic device, wherein the transmitter is configured to wirelessly connect to a listening device via a second Bluetooth connection; the transmitter configured to transmit an audio signal produced by the external audio input signal and received by the receiver; a low pass filter operatively connected to the receiver configured to produce a filtered output of the audio signal; and at least one haptic transducer having a solid low mass exciter operatively connected to the haptic device and configured to produce an inaudible tactile only haptic output based on the filtered output of the audio signal.

14. The wearable haptic device of claim 13, wherein the haptic output is between about 5 hz and 20 hz.

15. The wearable haptic device of claim 13, further comprising:

an amplifier operatively connected to the low pass filter and configured to produce an amplified filtered output of the audio signal.

16. The wearable haptic device of claim 13, further comprising: a band comprising an inner surface and an outer surface, wherein the at least one haptic transducer is disposed on the band and oriented to deliver the inaudible tactile haptic output towards the inner surface.

17. The wearable haptic device of claim 13, wherein the filter is an analog filter.

18. The wearable haptic device of claim 17, wherein the amplifier is a digital filter.

19. The wearable haptic device of claim 1, wherein the solid low mass exciter is selected from the group consisting of aluminum and titanium.

20. The wearable haptic device of claim 14, wherein the solid low mass exciter is selected from the group consisting of aluminum and titanium.

* * * * *